Dec. 19, 1967 R. B. BENDER 3,359,351
METHOD OF APPLYING INSULATION COATING FOR PIPE
Filed Oct. 18, 1965
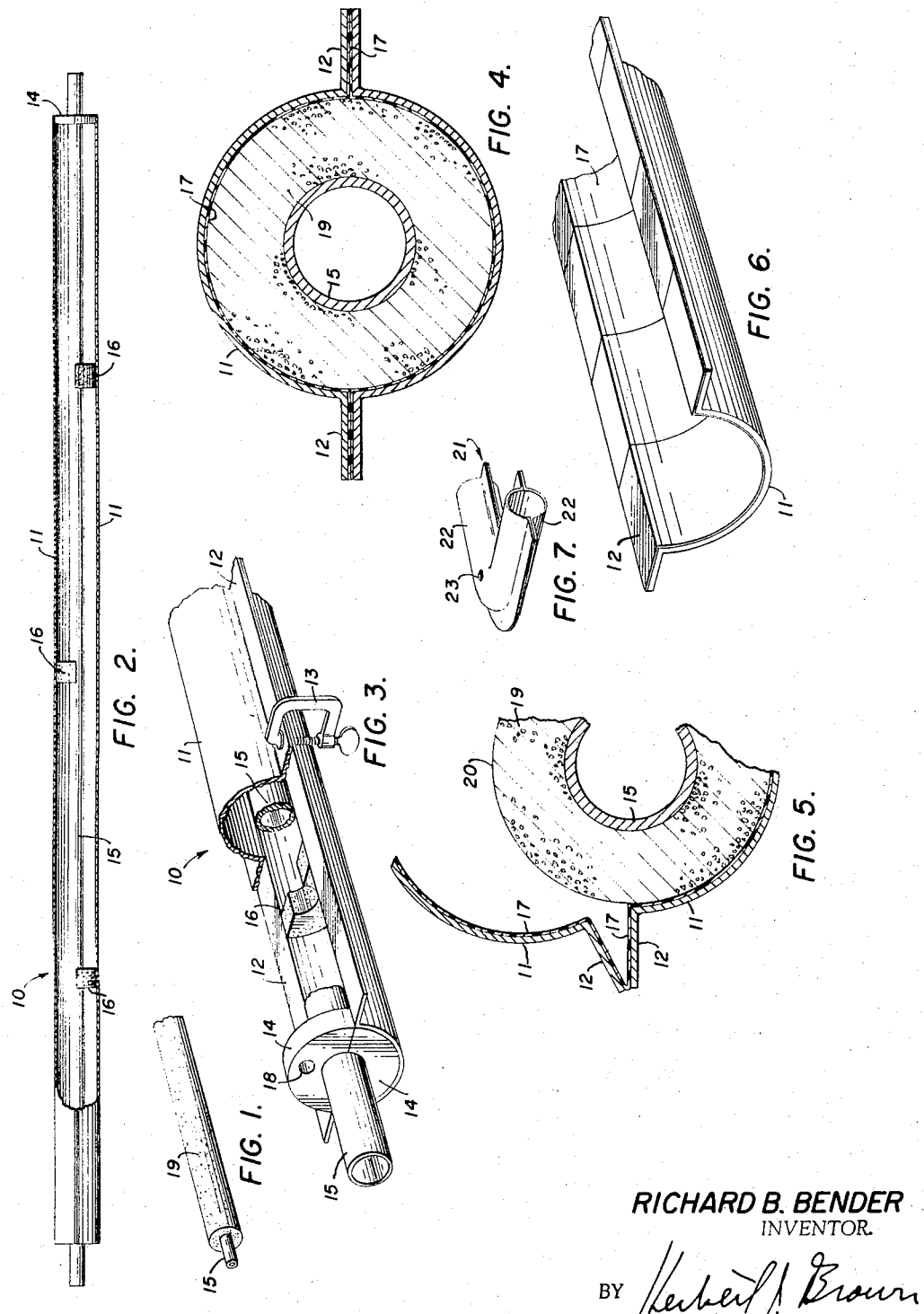
RICHARD B. BENDER
INVENTOR.
BY
ATTORNEY

United States Patent Office 3,359,351
Patented Dec. 19, 1967

3,359,351
METHOD OF APPLYING INSULATION
COATING FOR PIPE
Richard B. Bender, P.O. Box 11302,
Fort Worth, Tex. 76109
Filed Oct. 18, 1965, Ser. No. 528,659
3 Claims. (Cl. 264—45)

ABSTRACT OF THE DISCLOSURE

An insulating coating of unicellular foam molded around a length of pipe and method of applying the same. A feature of the invention has to do with applying the foam in situ directly to the pipe's surface for economy of operation, and when some foams are used, for example urethane, a good bond is obtained. The mold is lined with a wax-like resin which serves as a parting agent. The present insulating coating is self bonded directly to the pipe and has a self generated barrier film around its outer surface.

This application is a continuation-in-part of my copending application, Ser. No. 479,996, filed Aug. 16, 1965, now abandoned on Oct. 18, 1965.

This invention relates to insulation for pipe such as used in heating systems, cooling systems, insulation to prevent the freezing of fluid in pipes, to prevent condensation drip, and to prevent external corrosion. Particularly, the invention is directed to an improved coating around pipes and a method applying the same.

Heretofore, insulation for pipe has consisted, primarily, of asbestos or calcined plaster of Paris compositions which were molded and held in place around the pipe by means of tape. Also, some insulation consisted of air space within tubular jackets around the pipe. Further, some pipes were covered with foam resins but the application was costly and time consuming. Moreover, such insulating coatings included inner and outer applied shells, skins, tapes or the like which were expensive and time consuming in their application.

The primary object of the invention is to provide insulation for pipe having better insulating properties than other materials heretofore used for the same purpose.

Another object is to provide a means readily applying insulation around pipe using shop methods for straight lengths of pipe for economy of construction and additionally providing shop-like methods for applying the insulation around pipe joints in the field.

A particular object of the invention is to provide pipe insulation having a self generated tough barrier film therearound to further increase the insulation properties, to reduce accidental crushing of the coating, to enhance corrosion resistance and to provide a smooth surface for painting or other decoration.

These and other objects of the invention will become apparent from the following description and the accompanying drawing, in which:

FIGURE 1 is a perspective view of a broken length of pipe having an insulating coating in accordance with the invention.

FIGURE 2 is a side elevational and broken sectional view of a mold for applying an insulating coating in accordance with the invention and showing a length of pipe in the mold.

FIGURE 3 is an enlarged fragmentary perspective view of one end of the mold illustrated in FIGURE 2.

FIGURE 4 is a further enlarged transverse sectional view of the mold and showing the insulating coating and pipe in place.

FIGURE 5 is a view similar to FIGURE 4, but showing the mold partially open for removal of the insulated pipe.

FIGURE 6 is a perspective view of one end of the mold halves and showing a mold liner therein, and FIGURE 7 is a reduced scale perspective view of a mold for use in the field when insulating an L joint in accordance with the invention.

The mold 10 illustrated in FIGURES 1-6 includes elongate semicylindrical halves 11 of heavy sheet metal having flanges 12 along their longitudinal edges for assembling the mold by means of C-clamps 13. There are arcuate closures 14 in the ends of the mold halves 11, the inner arcs of which are of a size to receive the outside diameter of the pipe 15 to be coated. The ends of the pipe 15 project beyond the ends of the mold 10 and which projecting ends are subsequently coated as hereinafter described. As best shown in FIGURES 2 and 3 there are arcuate supports 16 of preformed urethane foam to assure concentric alignment of the pipe 15 within the mold 10. The arcuate supports 16 are staggered relative to each other to provide for the flow of the coating mixture.

The mold halves 11 are lined with a layer of wax-like liner material 17 such as polyethylene, polypropylene or polytetrafluoroethylene, sold under the trademark "Teflon." Within the scope of the invention the liner 17 may be lengths of film of class described which are not secured in place.

As shown in FIGURE 3, there is an opening 18 in one of the closures 14 for the simultaneous injection of A and B components which form urethane foam 19. Not shown, additional openings may be provided in the uppermold half 11 and the liner 17 therein. Because the arcuate supports 16 are of the same material as the foam 19, the supports become an integral part of the latter. By reason of the presence of the polyethylene liner 17, the resulting foam 19, after it solidifies, has a tough integral barrier film 20 therearound. The foam 19 is denser adjacent the film 20, which density resists crushing of the finished product. Similarly, the foam 19 adjacent the pipe 15 is relatively dense to provide a corrosion resistant layer.

The extending uncoated ends of the pipe 15 are connected in the usual manner at the place of installation and after which the uninsulated portions are covered in the manner described in the foregoing by using short length molds of shapes to fit the requirements. For example, in FIGURE 7, an L-shape mold 21 is shown, and which mold is comprised of halves 22 which have polyethylene liners, not shown. One of the halves 22 has an opening 23 for injecting the urethane foam mixture.

The invention is not limited to the exemplary construction and method herein shown and described, but may be made in various ways within the scope of the appended claims.

What is claimed is:
1. The method of applying a coating of unicellular foam around a length of pipe comprising the steps of placing said pipe in a mold, providing a lining surface in said mold of wax-like resin material of the class consisting of polypropylene, polyethylene and polytetrafluoro- ethylene and mixing and applying unicellular foam generating components in said mold around said pipe.

2. The method defined in claim 1 and wherein said components generate urethane foam.

3. The method defined in claim 1 and wherein said generated foam is placed in direct contact with the outer surface of said pipe.

References Cited

UNITED STATES PATENTS

| | | | |
|---|---|---|---|
| Re. 22,988 | 3/1948 | McLeish | 138—48 |
| 3,106,227 | 10/1963 | Crowley | 138—176 |
| 3,289,704 | 12/1966 | Nicosia | 138—141 X |
| 3,307,590 | 3/1967 | Carlson | 138—149 |
| 2,613,397 | 10/1952 | Borkland | 264—338 X |
| 3,137,744 | 6/1964 | Burrus | 264—45 |
| 3,258,512 | 6/1966 | Flower et al. | 264—45 |
| 273,687 | 3/1883 | Kelly | 138—149 |
| 312,037 | 2/1885 | Suhr | 138—149 |
| 1,871,508 | 8/1932 | Gardner | 138—149 |
| 2,324,181 | 7/1943 | Tulien | 138—149 X |
| 2,717,848 | 9/1955 | Jaye. | |
| 2,724,672 | 11/1955 | Rubin | 138—178 |
| 2,731,068 | 1/1956 | Richards | 138—178 |
| 2,782,251 | 2/1957 | Ebel et al. | |
| 2,857,931 | 10/1958 | Lawton | 138—149 X |
| 2,907,103 | 10/1959 | Lewis et al. | 138—178 |
| 2,923,650 | 2/1960 | Seme | 138—149 X |
| 2,936,259 | 5/1960 | Childers | 138—149 |
| 2,947,307 | 8/1960 | Hoppe. | |
| 2,964,065 | 12/1960 | Haroldson et al. | 138—178 |
| 3,007,203 | 11/1961 | Ammons. | |
| 3,050,786 | 8/1962 | John et al. | 138—178 |
| 3,151,633 | 10/1964 | Shuman | 138—149 X |
| 3,250,297 | 5/1966 | Mooneyham | 138—148 X |

FOREIGN PATENTS

| | | |
|---|---|---|
| 372,745 | 5/1932 | Great Britain. |
| 1,097,220 | 1/1961 | Germany. |

SAMUEL ROTHBERG, *Primary Examiner.*

NELSON C. CUDDEBACK, *Assistant Examiner.*